US 6,966,142 B1

(12) United States Patent
Hogsette et al.

(10) Patent No.: US 6,966,142 B1
(45) Date of Patent: Nov. 22, 2005

(54) INSECT TRAP

(75) Inventors: Jerome A. Hogsette, Gainesville, FL (US); David Arthur Carlson, Gainesville, FL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 10/145,787

(22) Filed: May 16, 2002

(51) Int. Cl.[7] ............................................. A01M 1/20
(52) U.S. Cl. .......................... 43/107; 43/114; 43/122
(58) Field of Search ................... 43/107, 114, 122, 43/139

(56) References Cited

U.S. PATENT DOCUMENTS

| | | | |
|---|---|---|---|
| 751,970 A * | 2/1904 | Zierl ............................ 43/122 |
| 4,310,985 A | 1/1982 | Foster et al. .................... 43/131 |
| 4,411,093 A * | 10/1983 | Stout ............................ 43/114 |
| 4,490,938 A * | 1/1985 | Baker ........................... 43/114 |
| 4,501,088 A | 2/1985 | Boisvert et al. ................ 43/118 |
| 4,577,434 A * | 3/1986 | Davis ............................ 43/114 |
| 4,849,216 A | 7/1989 | Anderson ...................... 424/84 |
| 4,930,251 A * | 6/1990 | Crisanti ......................... 43/114 |
| 5,150,541 A | 9/1992 | Foster et al. .................... 43/131 |
| 5,231,792 A | 8/1993 | Warner ......................... 43/122 |
| 5,392,558 A | 2/1995 | Blomquist ..................... 43/107 |
| 5,490,349 A | 2/1996 | Muramatsu .................... 43/122 |
| 5,775,026 A | 7/1998 | Pearce et al. ............... 43/132.1 |
| 5,836,104 A | 11/1998 | Epps ............................ 43/122 |
| 5,907,923 A | 6/1999 | Heath et al. ................... 43/122 |
| 6,032,406 A | 3/2000 | Howse .......................... 43/144 |
| 6,106,821 A | 8/2000 | Baker et al. ................... 424/84 |
| 6,301,827 B1 * | 10/2001 | Lankster ....................... 43/107 |

* cited by examiner

Primary Examiner—Kurt Rowan
(74) Attorney, Agent, or Firm—John D. Fado; Gail E. Poulos

(57) ABSTRACT

A safe, indoor trapping device for trapping and killing flying insects can be used in areas containing food, containing animals, for food preparation, etc. The device includes at least one removable trap body, a toxicant panel, and an insect collector.

12 Claims, 3 Drawing Sheets

INSECT TRAP

BACKGROUND OF THE INVENTION

1. Field of the Invention

This invention generally relates to devices and methods for using the devices to trap and kill flying insects using attractants and toxicants.

2. Description of the Related Art

There is a need for devices to control flying insects. The house fly, *Musca domestica* for example, is a major nuisance to homeowners and in commercial establishments such as food markets, large superstores, food preparation areas, farms, and animal-confinement facilities.

One method for controlling flies uses long strips of sticky tape hung from a wall or ceiling. In their normal flight behavior, flies land on the sticky tape and become permanently attached to it which is unsightly, especially in food-containing or preparation areas.

Fly traps are known in the art. In these traps, flies are attracted to decaying or odorous materials in containers and enter through an opening and are unable to exit from the container. See for example, U.S. Pat. No. 5,775,026 to Pearce et al., U.S. Pat. No. 4,310,985 to Foster et al.; U.S. Pat. No. 4,501,088 to Boisvert et al; U.S. Pat. No. 5,150,541 to Foster et al.; U.S. Pat. No. 5,231,792 to Warner et al., U.S. Pat. No. 5,392,558 to Bloomquist et al.; U.S. Pat. No. 5,490,349 to Muramatsu; U.S. Pat. No. 5,907,923 to Heath et al.; and U.S. Pat. No. 6,032,406 to Howse et al.; etc.

While various flying insect traps are known in the art, there remains a need for a safe, indoor-use fly trap which is sanitary and visually appealing. The present invention, as described below, solves some of the problems associated with related art traps and is different.

SUMMARY OF THE INVENTION

It is therefore an object of the present invention to provide a trap for flying insects that is useful in areas, such as for example, containing foods used for food preparation, containing animals; which prevents flying insects and toxicants from contacting foods, animals, and preparation surfaces.

A further object of the present invention is to provide a trap that includes at least one removable body containing perforations allowing insects to enter the at least one removable body but not easily exit.

A still further object of the present invention is to provide a trap including at least one removable perforated body which contains a suspended or frictionally-fitted toxicant-containing panel.

Another object of the present invention is to provide a trap including at least one removable body containing perforations allowing insects to enter body but not easily exit, a suspended or frictionally-fitted toxicant-containing panel, and a collection means.

Further objects and advantages of the invention will become apparent from the following description.

DETAILED DESCRIPTION OF THE INVENTION

The present invention, provides for the first time, safe, indoor traps for flying insects such as, for example, the house fly (*Musca domestica*), the lesser house fly (*Fannia* spp.), the bush fly (*Musca vestustissima*), blow fly (*Calliphora vomitoria*), fruit fly (*Drosphilia melanogaster*), stable fly (*Stomoxys calcitrans*), etc. The trap is useful for home settings, commercial settings such as, for example, food markets, supercenters, food preparation areas, farms, and animal confinement facilities. Currently there is no safe way to control flies in the above-mentioned locations because spraying of pesticides is not possible or practical, open toxic surfaces cannot be deployed, nor can unrestricted scatter baits based on sugar and toxicant be used. Ultraviolet light traps with electrocuting grids cannot be used near food preparation areas, and similar devices containing sticky panels cannot always be placed in the most desirable location.

Figure 1:
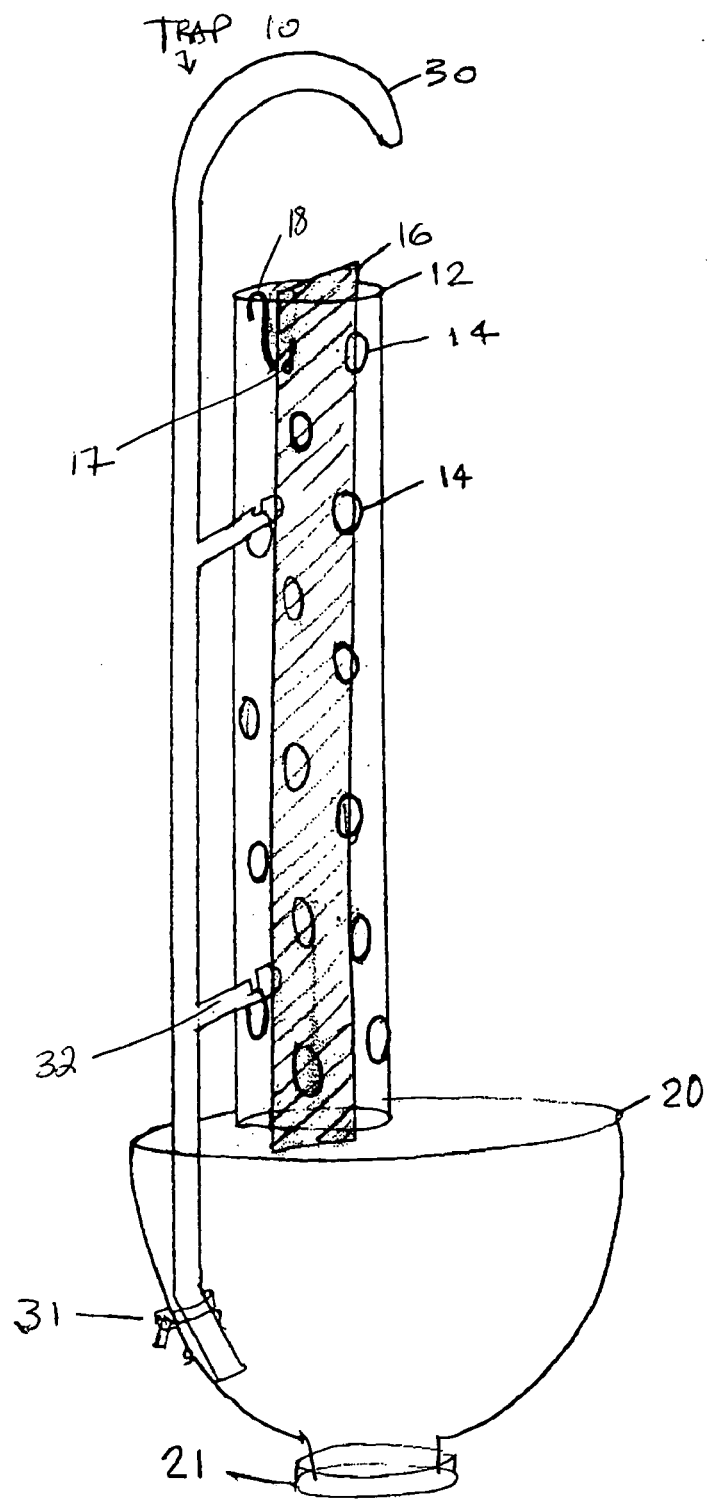
FIG. 1 is a drawing of trap 10 showing support means 30, removable trap body 12, with openings 14, containing panel 16, collection means 20 with covering 21, support means 30 and wire ties 31.
Figures 2A, 2B:
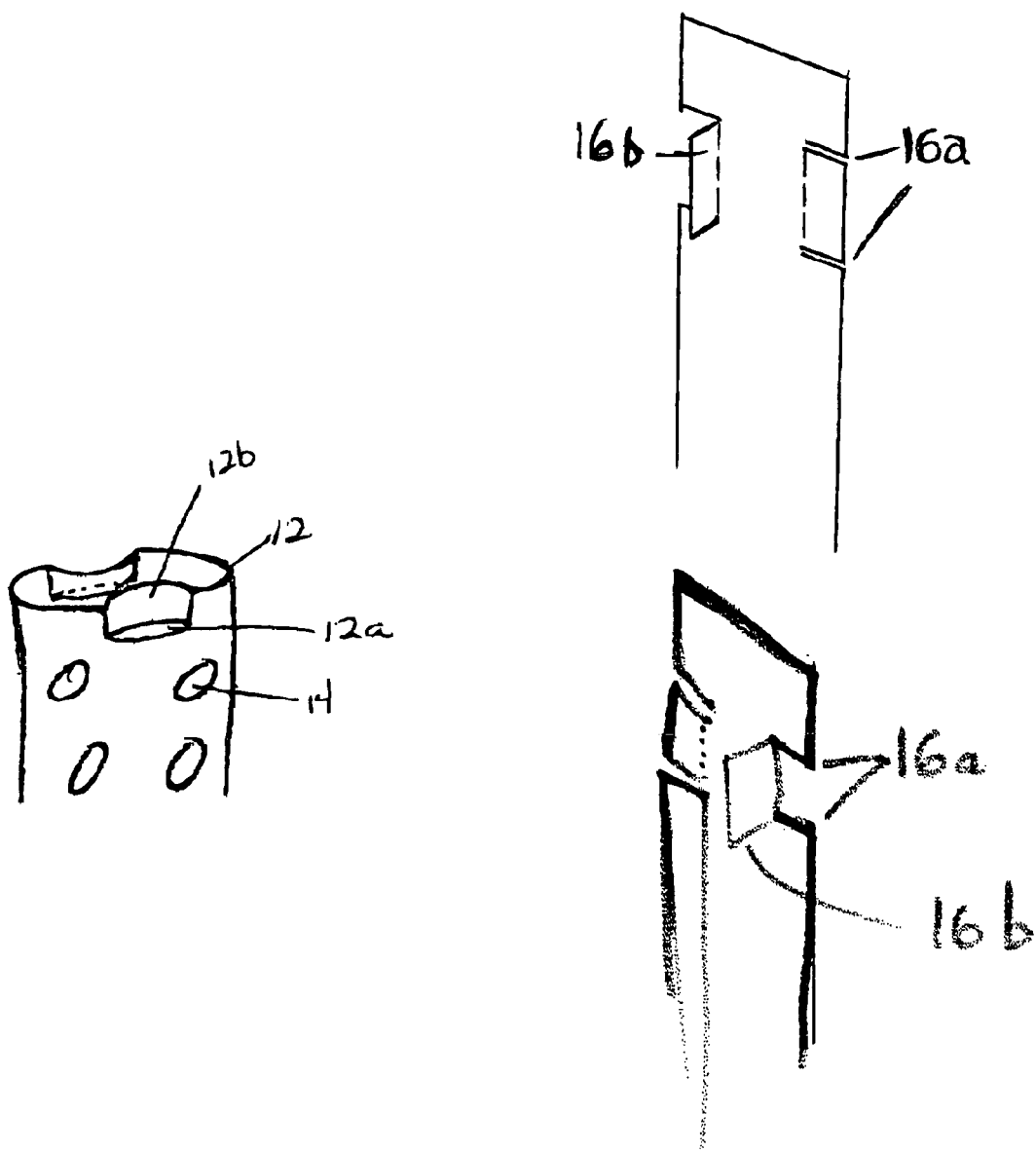
FIG. 2a is a drawing of an embodiment of removable trap body 12 showing slits 12a and means for frictional fit 12b which allows a panel to be frictionally fitted into body 12.
FIG. 2b is a drawing of an embodiment of panel 16 showing slits 16a in panel 16 to form panel means for frictional fit 16b.

One embodiment of trap 10 (FIG. 1) includes removable trap body 12, collection means 20, and support means 30. Removable body 12 can be cylindrical-shaped and made from any suitable clear, flexible material, such as for example, polyethylene terephthalate, LEXAN®, acetate sheeting, MYLAR®, butyrate, BIVAX®, ACYRLITE®, etc; having a plurality of perforations 14 of a size that allows target insects to enter but not easily exit body 12 before ingesting bait containing toxicant. For house flies, a cylinder of approximately 14 inches high and approximately 1.8 inches in diameter, containing about 30 perforations of approximately 0.5 inch in diameter made of polyethylene terephtahalate is useful. Body 12 can be of any size or shape as long as flying insects will easily enter through but not easily exit from perforations 14. Body 12 further includes panel 16 containing a feeding stimulus and an active ingredient (AI) such as a toxicant. In one embodiment, body 12 can have at least two opposed slits 12a in the upper wall of body 12 which enable a portion of the body wall to be bent inwardly allowing panel 16 to frictionally fit within body 12 (FIG. 2a). However, any means for providing a frictional fit of panel 16 is well within the ordinary skill in the art such as slits 16a in panel 16 to form panel means for frictional fit 16b (FIG. 2b).

Figures 3A, 3B, 3C:
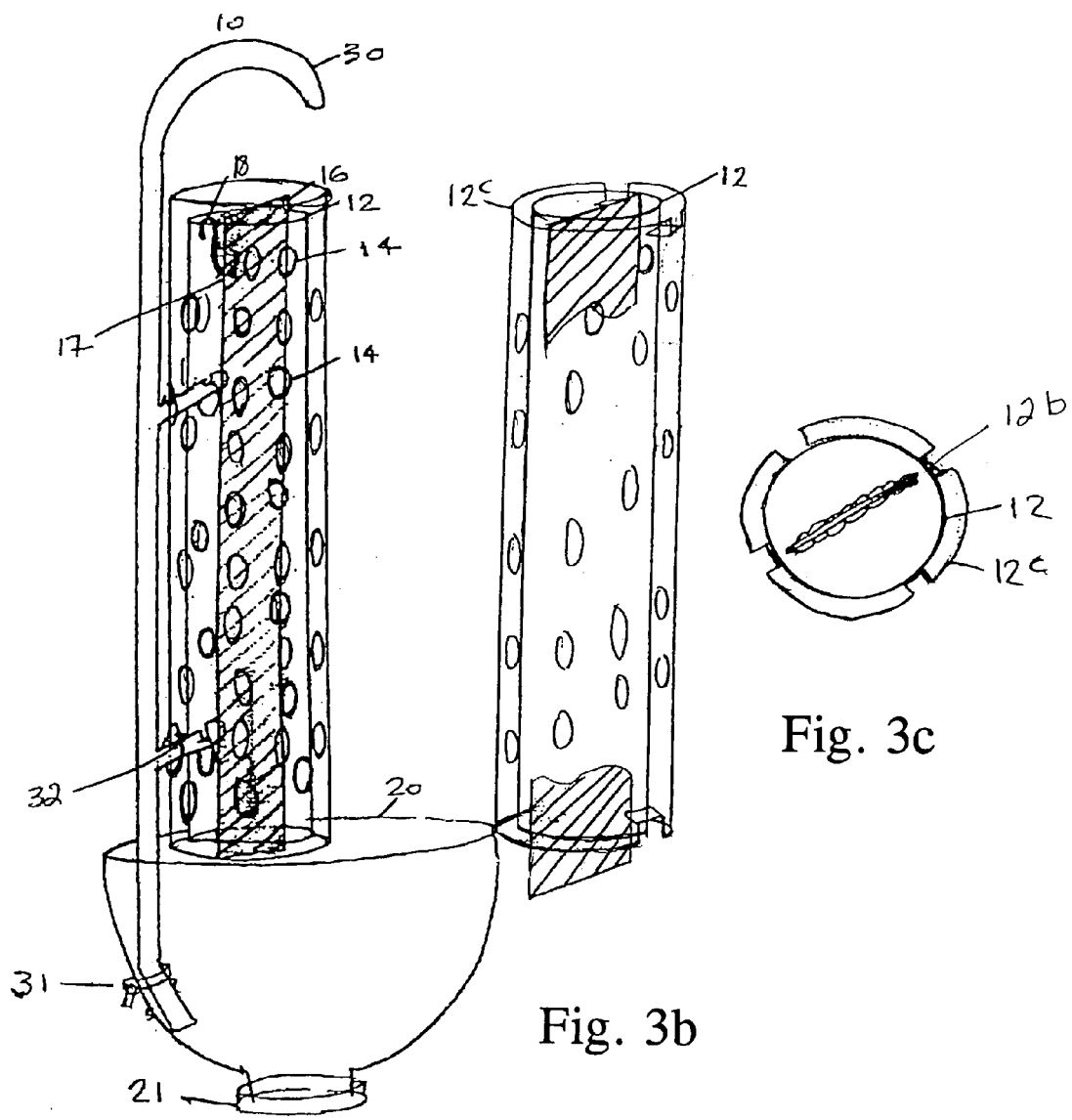
FIG. 3a is a drawing of another embodiment of Trap 10 showing an inner removable body 12, an outer removable body 12c, support means 30, and panel 16.
FIG. 3b is a drawing of another embodiment of removable trap body showing an inner removable body 12, an outer removable body 12c, and panel 16.
FIG. 3c is a drawing of an overhead view of another embodiment of Trap 10 showing an inner removable body 12, an outer removable body 12c, means for frictional fit 12b, and panel 16.

A second embodiment of trap 10 includes an inner body 12 and an outer body 12c. Outer body 12c is made of the same material with the same number and size of perforations 14 as body 12 described above. Outer body 12c has a diameter greater than inner body 12. The determination of the diameter for outer body 12c for a particular flying insect is well within the ordinary skill in the art given the teachings of the present invention. For example, for house flies, body 12c can be approximately ½ inch larger than the diameter of inner body 12. Outer body 12c can be attached to trap 10 using any conventional attaching means. One example for attaching body 12c includes making at least one slit 12a, as depicted in FIGS. 3 and 2a, in order to form a means for frictional fit 12b at the top of body 12c. Once body 12c is placed over inner body 12, it is rotated about 45 degrees so that the two sets of perforations 14 do not coincide.

Panel 16 is made of any material which will support a coating of a feeding stimulant and an active ingredient (AI) such as a toxicant. Materials suitable for panel 16 include any solid material that is inert with respect to the active ingredient and with respect to any of the additives present in the formulation of the active ingredient. It is either nonporous and non-retentive of atmospheric moisture, or coated with a non-porous coating underlying the coating layer that includes an active ingredient and sealing off any pores in the core material. Examples of materials useful include waxed or plastic coated paper, polymers, examples of which are polyvinyl chloride, polyethylene, and polypropylene, in the form of a nonporous sheet. Panel 16 can be frictionally fitted within body 12 as described above. In one embodiment (FIG. 1), panel 16 can include a small aperture 17. A means for hanging 18 can be inserted into aperture 17 in order to hang or suspend panel 16 from the top edge of removable body 12. Means for hanging 18 can be any means capable of hanging or suspending panel 16 within body 12. Examples include a hook, such as an S-hook, a plastic or wire tie, etc. As described above, panel 16 can include slits 16a on each side of panel 16 to form tab-like means for frictional fit 16b (FIG. 2b). Panel 16 is coated with a mixture of a sugar and an active ingredient such as a toxicant in a solvent. Application of the mixture to the substrate is achieved by any conventional application method, such as for example, dipping, brushing, spreading with a blade or spraying. The solvent is allowed to evaporate, leaving a solid layer on at least one side of panel 16. The active ingredient is usually a toxicant, which can be any fast-acting nonvolatile toxicant, known to one of ordinary skill in the art such as, for example, nithiazine, dimethoate, Diptrex™, Methomyl (S-methyl N-methylcarbamoyl) oxy thioacetamidate, etc. The mixture contains about 0.1% active ingredient (AI) toxicant. If an attractant is used, it is mixed with the toxicant prior to mixing with the sugar. Any sugar can be used as a feeding stimulus. A ratio of about 98.8:1 of sugar/toxicant is prepared by dissolving about 11 mg of toxicant in about 0.98 ml of water, and then adding this to a premixed sugar solution (about 1 g sucrose in about 3.2 ml water). The solution is transferred to one or both sides of a panel within about 2 hours of preparation and allowed to air dry prior to use. The panel is suspended from a hanging means 18 or is frictionally fitted in removable body 12 (FIGS. 2a and 2b). For house flies, a strip of approximately 1.5 inches by approximately 11 inches is useful. One of ordinary skill in the art could readily determine the toxicant and feeding stimulus needed for the target flying insect of interest. Commercially available bait/toxicant strips, such as for example, QUIKSTRIKE™, are also useful in the present invention. The commercially available strips are cut to fit within body 12 as described above. It is preferable to use a toxicant that has a very low mammalian toxicity. Replacement of removable body 12 containing toxicant panel 16 is safe and quick. It is recommended to replace body 12 with panel 16 about every three months. Removable body 12 containing panel 16 is removed from trap 10 without contact with the toxicant. A new body 12 containing a new panel 16 attaches quickly to trap 12 as described below. For the second described embodiment containing bodies 12 and 12c, inner body 12 with panel 16 is removed and discarded.

Optionally an attractant composition can be included such as, for example, those containing a sex pheromone. The selection of pheromones for a particular flying insect is well within the ordinary skill in the art. The pheromone is added to achieve a flying insect attracting concentration. A sex pheromone useful in the present invention, (Z)-[9]-tricosene for example, is used at a concentration of at least about 0.025% to the inert ingredient sugar which is at about 99.9%.

Collection means 20 is a reusable inverted conical-shaped container optionally including an opening having a removal cover 21 such as for example a screw cap or a snap cap 21. Means 20 can be made of any material which is clear or opaque. The material is not critical to the function of trap 10. Means 20 is attached to support means 30 using any conventional means for attaching, such as for example, wire ties 31 as shown in FIG. 1. Attachment of means 30 is well within the ordinary skill in the art. Removable body 12 and 12c may extend into means 20 at least about 1 inch. Body 12 and 12c are positioned to the top of collection means 20 so that insects will not bounce out when dropping down into means 20. Means 20 can optionally be coated with a sticky material, such as for example polyisobutylene, to facilitate retention of falling insects and/or bait. The sticky material may be applied to a removable inner surface to facilitate cleaning. For house flies, it is preferred to use at least about a 4 inch diameter cone-shaped container wherein the diameter is the widest part of said container. Insects can be removed from means 20 by removing covering 21 or by removing means 20 from trap 12.

Support means 30 is rigid and rod-shaped. Support means 30 can be optionally curved at top as shown in FIG. 1 in order to suspend trap 10 from a ceiling, light fixture, pipe, hook, etc. Means 30 is made of any material capable of supporting body 12 and means 20 containing insects. Examples of materials include polyethylene, aluminum, polystyrene, steel, polyethylene terephthalate, PVC, etc. Means 30 should be long enough to support both removable body 12 or removable bodies 12 and 12c, and collection means 20. Removable body 12 or removable bodies 12 and 12c containing panel 16 attaches to means 30 using any conventional means for removably attaching 32 such as hooks, plastic or metal wire ties, plastic or metal clips, etc. Removable body 12 should be easily detachable to facilitate environmentally safe disposal. It is preferred that means 30 have at least two means for removably attaching equally distanced along its length for removably attaching body 12 or body 12c. Means for removably attaching 32 can be for example, arm-shaped extensions of means 30 which slip and hook into a perforation 14 of body 12 or 12c. (FIG. 1). Means 32 can also be affixed to support means 30 using any conventional means for affixing. Means 30 attaches to any substrate using any conventional means such as hanging by or from a hook, attaching by one or more plastic or metal wire ties to an electrical cable, etc.

The following examples are intended only to further illustrate the invention and are not intended to limit the scope of the invention which is defined by the claims. By way of example, laboratory reared pesticide-resistant house flies are used in the following examples.

EXAMPLE 1

Three panels 16, each about 1.5 inches by about 11 inches were used in the traps. One set of panels contained QUIKSTRIKE™, a commercial bait containing the toxicant nithiazine, which were cut from the commercially available product. The panels 16 were suspended by a polyethylene terephthalate tube of approximately 1.8 inches in diameter by about 14 inches in length with about 30 perforations of about 0.5 inch each in diameter which form removable body 12. The panels were suspended from body 12 by placing an S-hook through an aperture cut into the top of panel 16. The other end of the hook was slipped over the top edge of body 12 (FIG. 1). Body 12 containing the panel 16 was attached to a polyethylene rod 30 that was approximately 5/16 inch by about 14 inches long. Rod 30 had two notched pegs or hooks (32) of the same material attached by heat-welding. Body 12 was hung on the hooks by inserting each hook into perforation 14 (FIG. 1). The top 1/3 of a 2 liter plastic soft drink bottle including the screw cap was used to make a cone-shaped collection means 20 of about 4 inches in diameter. It was painted with colored spray paint to make it opaque so that dead insects were not visible. Means 20 was attached to rod 30 by making two holes in the cone, positioning rod 30 into means 20, and securing the two together with a wire tie. The bottom portion of body 12 sits just inside collection means 20 to prevent insects from bouncing out.

In Trial 1, three traps were hung from 3 equally spaced ring stands at about 3 feet above the floor and placed in a small room (about 8 feet×8 feet) containing about 100 laboratory reared pesticide-resistant house flies and left overnight. About 98% of the released house flies were killed using traps 10.

In trial 2, Commercial QUIKSTRIKE™ with mesh cover removed was used as panel 16. Trap 10, fitted with panel 16 containing QUIKSTRIKE™ without mesh cover captured twice as many house flies compared to traps having the cover intact (mean of 48 flies vs 24 flies, 2 tests). Panel 16 retained effectiveness until the toxicant was completely consumed by flies.

In trial 3, Panel 16 was prepared containing Golden Malrin bait (GM) sugar-based fly bait (Wellmark International, Bensonville, Ill. 60106) by sprinkling onto each side of a double sided sticky card that was about 1.5×10 inches, leaving approximately 12 grams bait per card. This bait has approximately 1.1% methomyl, approximately 0.049% (Z)-9-tricosene as attractant ingredients with approximately 98.851% sugar as feeding stimulant. A single trap 10 was suspended from a transverse string about 5 feet from the floor in a small room of about 8 feet×8 feet, containing about 100 laboratory reared pesticide resistant house flies that had been starved for about 4 hours and left overnight with water ad lib but no food other than the bait. Lights were left on for entire trial. Counts were made at about 1, 3, and 20 hours. In 6 tests, with trap 10 with panel 16 containing the Golden Malrin sugar bait particles stuck to a sticky card, a total of about 67.0±10.9% dead flies were counted at 20 hours (Table 1 below). Counts included number of dead house flies in collection means 20 (IN), number of flies in a shallow plastic pan (about 24×36") on the floor under trap 10 (out), and number of flies on the rest of the floor (floor). In 6 tests without bait, a single trap 10 without panel 16, about 13.7±10.7% of the flies were dead at 20 hours (Table 1 below).

In trial 4, three sets of 6 tests each using a single trap 10 were run as above. In tests of trap 10 with panel 16 containing Quikstrike (QS), about 58.9±6.6% were killed, panel 16 with Golden Malrin (GM) sugar bait as in Trial 3, about 71.6± 15.5% were killed, and panel 16 with Blue Streak sugar-based fly bait (Bush, Boake Allen Inc., 2711 Irving Park Rd., Chicago, Ill. 60618) stuck on an about 1.5×10 inch double-sided sticky card produced about a 4±7.4±7.3% kill at 20 hours (Table 2 below). The toxicants did not appear to cause statistically different results when dead flies were counted, although the trend favored the Golden Malrin bait as giving the best results as panel 16.

Trial 5, tests of paired trap 10 in the same room (n=24) panel 16 QUIKSTRIKE plus about 1 mg of artificial molasses flavoring (?s, Farniou Companies, Inc., Omaha, Nebr. 68112) killed an average of about 32.7 house flies compared to about 22.8 house flies with panel 16 QUIKSTRIKE alone, for a kill ratio of about 1.4:1 Plain QUIKSTRIKE killed more flies in only 3 of the 24 tests.

In Trial 6, tests of paired trap 10 in the same room, panel 16 QUIKSTRIKE plus natural molasses bait added killed an average of about 31% compared to just about 12.9% with QUIKSTRIKE alone, for a kill ratio of 2.4. QUIKSTRIKE alone killed more flies in just 1 of the 12 tests.

In trial 7, replicated tests were made having a modified removable body 12 having concentrically arranged body 12c surrounding it made of the same material with the same number and size of perforations. Slits 12a are made in outer body 12c to form tabs when pushed inward. This allows frictional a fit of body 12c to inner body 12 (FIG. 3). The two bodies 12 and 12c are fixed one inside the other but rotated about 45 degrees so that perforations 14 do not coincide. Body 12c is about 1/2 inch larger in diameter and is held in place by means for frictional fit 12b (tabs) created by slits 12b or by 4 tabs cut into the ends of each body 12 or body 12c that are about 1/4 inch apart. The purpose is to allow questing house flies to enter the trap to reach panel 16 but not to readily escape after ingesting the toxicant. Large numbers of laboratory-reared pesticide resistant house flies (about 71.7%) were captured in collection means 20 in the modified traps of trial 7 and fewer flies escaped the trap itself before dying compared to the unmodified trap 12 (28.3%) (Table 3 below). Overall, the double body embodiment of trial 7 was more effective with about 64% of the released flies being killed compared to 36% by the single body trap. The attractant/toxicant was identical in each and about 80–120 pesticide-resistant colony house flies were released into the test rooms.

TABLE 1

Percent Response at the end of about 1, 3 and 20 hours.

| Bait | 1 hr. | | 3 hr. | | 20 hr. | |
| --- | --- | --- | --- | --- | --- | --- |
|  | GM | Blank | GM | Blank | GM | Blank |
|  | 17.97 | 0.00 | 40.09 | 12.21 | 67.04 | 7.63 |
|  | 20.91 | 1.82 | 35.85 | 13.68 | 61.98 | 30.09 |
|  | 25.24 | 4.11 | 56.57 | 13.37 | 76.59 | 22.63 |
|  | 25.18 | 2.03 | 52.23 | 8.13 | 82.08 | 14.23 |
|  | 2.47 | 0.00 | 19.24 | 1.24 | 51.30 | 3.11 |
|  | 23.44 | 0.00 | 46.00 | 2.00 | 63.36 | 4.68 |
| Avg | 19.20 | 1.33 | 41.66 | 8.44 | 67.06 | 13.73 |
| ST Dev | 8.66 | 1.66 | 13.36 | 5.65 | 10.99 | 10.76 |

TABLE 2

Percent Response at the end of 1, 3, and 20 hours

| Bait | 1 hr | | | 3 hr | | | 20 hr | | |
| --- | --- | --- | --- | --- | --- | --- | --- | --- | --- |
|  | QS | GM | BS | QS | GM | BS | QS | GM | BS |
|  | 12.52 | 16.26 | 6.90 | 24.00 | 27.87 | 9.20 | 55.29 | 51.09 | 37.94 |
|  | 14.92 | 24.53 | 8.34 | 24.10 | 31.88 | 8.34 | 58.54 | 56.41 | 52.11 |
|  | 16.02 | 20.38 | 18.54 | 36.85 | 53.22 | 42.87 | 64.08 | 75.86 | 59.09 |
|  | 12.30 | 16.34 | 12.96 | 33.38 | 35.29 | 25.92 | 69.40 | 92.79 | 45.71 |
|  | 13.89 | 24.49 | 13.18 | 20.46 | 45.83 | 23.32 | 54.08 | 80.59 | 43.59 |
|  | 10.79 | 16.62 | 13.01 | 16.67 | 37.77 | 26.90 | 51.97 | 73.27 | 45.98 |
| Avg | 13.41 | 19.77 | 12.15 | 25.91 | 38.64 | 22.76 | 58.89 | 71.67 | 47.40 |
| StDev | 1.91 | 3.98 | 4.13 | 7.71 | 9.36 | 12.83 | 6.66 | 15.51 | 7.32 |

TABLE 3

Percent Response at the end of 20 hours, single body 12 versus double body 12c embodiment in competitive tests (n = 6).

| Day No. | Location of Dead Flies | Body 12 | Body 12c | (%)a | Total [%]b |
|---|---|---|---|---|---|
| 1, Rm 1 | In collection means 20 | 7 | 28 | (80) | |
| | In pan under Trap | 10 | 3 | | |
| | On Floor (0.5 m) | 11 | 5 | | |
| | | 28 | 64 | | [56] |
| Rm 2 | In collection means 20 | 7 | 34 | (82) | |
| | In pan under Trap | 17 | 0 | | |
| | On Floor (0.5 m) | 0 | 36 | | |
| | | 24 | 70 | | [74] |
| 2, Rm 1 | In collection means 20 | 30 | 75 | (71) | |
| | In pan under Trap | 3 | 5 | | |
| | On Floor (0.5 m) | 5 | 9 | | |
| | | 38 | 89 | | [70] |
| Rm 2 | In collection means 20 | 12 | 42 | (78) | |
| | In pan under Trap | 2 | 0 | | |
| | On Floor (0.5 m) | 10 | 25 | | |
| | | 24 | 67 | | [74] |
| 3, Rm 1 | In collection means 20 | 16 | 36 | (69) | |
| | In pan under Trap | 0 | 3 | | |
| | On Floor (0.5 m) | 9 | 10 | | |
| | | 25 | 49 | | [66] |
| Rm 2 | In collection means 20 | 30 | 31 | (50) | |
| | In pan under Trap | 3 | 2 | | |
| | On Floor (0.5 m) | 13 | 5 | | |
| | | 46 | 38 | | [45] |
| Avg: | | | | (71.7) | [64] | a 71.7% catch of dead house flies were captured in collection means with the double body 12/12c (Type 2).
b 64% of overall kill of house flies using trap with double body 12/12c.

The foregoing detailed description is for the purpose of illustration. Such detail is solely for that purpose and those skilled in the art can make variations without departing from the spirit and scope of the invention.

INDEX OF THE ELEMENTS

10. Trap
12. Removable Trap Body
12a. Slit
12b. Means for Frictional Fit
12c. Outer Removable Trap Body
14. Perforations
16. Panel
16a. Slit in Panel
16b. Panel Means for Frictional Fit
17. Aperture
18. Hanging Means
20. Collection Means
21. Covering
30. Support Means
31. Wire ties
32. Means for Removably Attaching

We claim:

1. A trapping system for flying insects consisting essentially of:
   (a) at least one removable trap body of a clear, flexible material containing a plurality of perforations of a size to allow a target insect to enter wherein said body is open at its top and bottom,
   (b) a bait panel located within said at least one trap body wherein said bait panel includes a feeding stimulus and a toxicant,
   (c) a collection means operatively connected to said trap body to collect insects that drop through a bottom opening in said trap body and said trap body is operatively positioned above said collection means to prevent insects from bouncing out of said collection means, and
   (d) a rigid support means for said at least one trap body and said collection means wherein said support means is externally operatively connected to said trap body and said collection means and operatively positions said trap body over said collection means.

2. The system of claim 1 wherein said collection means is cone-shaped with a removable end cap.

3. The system of claim 1 wherein said collection means is coated with a sticky material to enhance retention of insects and any toxicant-containing debris from said bait panel.

4. The system of claim 1 wherein said rigid support means is a rod-shaped device.

5. The system of claim 1 wherein said toxicant panel further includes a pheromone.

6. The system of claim 1 wherein said bait panel includes a toxicant selected from the group consisting of nithiazine, s-methyl-N-methylcarbamoyl, dimethoate, dimethyl (2,2,2-trichloro-1-hydroxyethyl)phosphonate, oxythioacelamidate, and mixtures thereof.

7. A trapping system for flying insects consisting of
   (a) one removable trap body of a clear, flexible material containing a plurality of perforations of a size to allow a target insect to enter wherein said trap body has a top and bottom opening,
   (b) a bait panel located within said trap body wherein said bait panel includes a feeding stimulus and a toxicant,
   (c) a collection means operatively connected to said trap body to collect insects that drop through said bottom opening in said trap body and said trap body is operatively positioned above said collection means to prevent insects from bouncing out of said collection means, and
   (d) a rigid support means for said trap body and said collection means wherein said support means is externally operatively connected to said trap body and said collection means and operatively positions said trap body over said collection means.

8. The system of claim 7 wherein said collection means is cone-shaped with a removable end cap.

9. The system of claim 7 wherein said collection means is coated with a sticky material to enhance retention of insects and any toxicant-containing debris from said toxicant panel.

10. The system of claim 7 wherein said rigid support means is a rod-shaped.

11. The system of claim 7 wherein said toxicant panel includes a toxicant selected from the group consisting of nithiazine, s-methyl-N-methylcarbamoyl, dimethoate, dimethyl (2,2,2-trichloro-1-hydroxyethyl)phosphonate, oxythioacelamidate, and mixtures thereof.

12. The system of claim 7 wherein said bait panel further includes a pheromone.

* * * * *